United States Patent

Casillo et al.

Patent Number: 5,902,446
Date of Patent: May 11, 1999

[54] LABELER APPARATUS AND METHOD OF APPLYING SELF-ADHESIVE LABELS TO COMPACT DISKS

[75] Inventors: Joseph Casillo, Hamden; Frederick M. Johnson, Higganum; John M. Heath, Jr., Hamden; Gregory R. Veilleux, Wallingford; William J. Dufault, West Haven, all of Conn.

[73] Assignee: Neat-O LLC, East Haven, Conn.

[21] Appl. No.: 08/661,443

[22] Filed: Jun. 11, 1996

Related U.S. Application Data

[62] Division of application No. 08/410,239, Mar. 24, 1995, Pat. No. 5,543,001, which is a continuation of application No. 08/287,153, Aug. 8, 1994, abandoned.

[51] Int. Cl.⁶ .............................. B32B 31/04; G11B 7/00
[52] U.S. Cl. ..................... 156/379.8; 156/556; 156/579; 156/DIG. 2; 29/271; 29/464; 269/47
[58] Field of Search ............................... 156/247, DIG. 1, 156/DIG. 2, 579, 379.8, 556; 283/81; 209/47, 909; 264/107; 369/14, 58; 29/271

[56] References Cited

U.S. PATENT DOCUMENTS

| | | |
|---|---|---|
| 1,500,698 | 7/1924 | Wiehl . |
| 3,687,769 | 8/1972 | Dague ..................................... 156/219 |
| 4,213,927 | 7/1980 | Alberti . |
| 4,385,460 | 5/1983 | Hanna . |
| 4,903,255 | 2/1990 | Sugaya et al. . |
| 5,084,127 | 1/1992 | Nakamura . |
| 5,316,464 | 5/1994 | Lexell . |
| 5,346,654 | 9/1994 | Kodaka et al. . |
| 5,421,950 | 6/1995 | Parrish . |

FOREIGN PATENT DOCUMENTS

| | | |
|---|---|---|
| 0422774A2 | 4/1991 | European Pat. Off. . |
| 0514156A2 | 11/1992 | European Pat. Off. . |
| 2290526A1 | 1/1986 | United Kingdom . |
| 2 203 278 | 10/1988 | United Kingdom . |
| 2 209 863 | 5/1989 | United Kingdom . |
| WO 96/05057 | 2/1996 | WIPO . |

*Primary Examiner*—Michael W. Ball
*Assistant Examiner*—Sam Chuan Yao

[57] ABSTRACT

A labeler for the near-perfect manual placement of self-adhesive labels onto compact disks which has a positioning cone with an elongated stock member, a flat surface with a diameter greater than that of the elongated stock member, and a point on an end of the positioning cone opposed from the elongated stock member. The labeler also has a positioning plate with a positioning hole in the center, a surface area upon which a self-adhesive label can be placed and a side area to add strength to the positioning plate. The labeler further has a cylindrical base with a flat lip member upon which the positioning plate can rest substantially flat, a flat bottom to keep the cylindrical base substantially flat when used on a substantially flat surface, a wall to keep the flat lip member lifted substantially off of the substantially flat surface and a hollow cavern into which a substantial portion of the positioning cone can fit. A method for affixing a label to a compact disk using the labeler is also described.

36 Claims, 1 Drawing Sheet

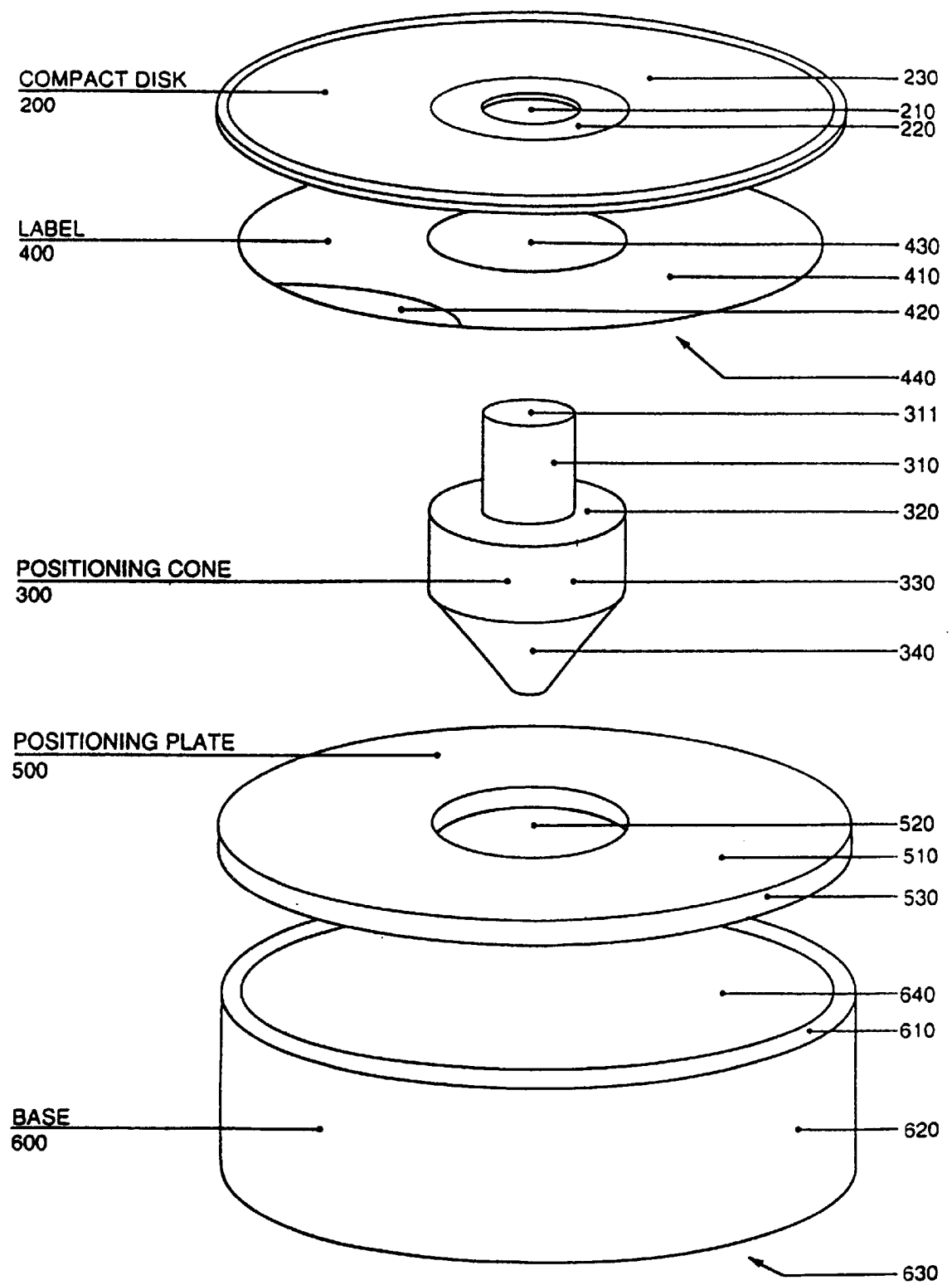

LABELER APPARATUS AND METHOD OF APPLYING SELF-ADHESIVE LABELS TO COMPACT DISKS

CONTINUING DATA

The present application is a divisonal of U.S. patent application Ser. No. 08/410,239, filed Mar. 24, 1995, now U.S. Pat. No. 5,543,001 which is a continuation of 08/287,153, filed Aug. 8, 1994, now abandoned.

FIELD OF THE INVENTION

This invention relates generally to labelers and labeling methods and more specifically to a labeler and a method for the manual placement of self-adhesive labels onto compact disks.

BACKGROUND OF THE INVENTION

The proliferation of compact disks (discs), also known as laser disks, in the form of music as well as CD-ROM products has become extensive. In recent years, recordable compact disks such as those produced by SONY, 3M, and KODAK have grown in popularity. With this recent use has grown a need to label these disks once they have been produced. While large manufacturers have their labels painted onto the disks, this method is entirely impractical for the occasional compact disk producers. Many users have attempted to mark their disks with ink markers, but this is unattractive and can cause damage to the disk by breaking down the coating which protects the disk. As a result, manufacturers such as AVERY DENISON have begun producing self-adhesive labels shaped like and designed for compact disks. Unfortunately there is no available method or apparatus for the placement of these labels on compact disks, despite the fact that an incorrect placement is unsightly and may result in damage to the motor of the compact disk player device by unbalancing the disk and causing uneven spinning.

SUMMARY OF THE INVENTION

Besides solving the above noted problems, it is an object of the present invention to provide a labeler for the near perfect manual placement of pre-made and self-adhesive labels onto compact disks.

Another object of the present invention is to provide a labeler for the placement of pre-made and self-adhesive labels onto compact disks with limited bubbling.

Yet another object of the present invention is to provide a labeler for the near perfect placement of pre-made and self-adhesive labels onto compact disks without damaging the compact disks.

These and other objects of this invention will become more apparent from the following description and accompanying drawings in which like reference numerals depict like elements.

The foregoing objects are attained by the labeler of the present invention which comprises: a positioning cone with an elongated stock, a flat surface with a diameter greater than that of the elongated stock, and a point on an end of the positioning cone opposed from the elongated stock; a positioning plate with a positioning hole in its center, a surface area upon which a self-adhesive label can be placed, and a side area sufficient to add strength to the positioning plate; and a cylindrical base with a flat lip member upon which the positioning plate can rest, a flat bottom to keep the cylindrical base substantially flat when used on a substantially flat surface, a wall to keep the flat lip member lifted substantially off of the flat surface, and a hollow cavern into which a substantial portion of the positioning cone can fit.

The labeler is used in the following manner. The positioning plate is placed on top of the cylindrical base so that the positioning plate comes into substantial contact with the flat lip member of the cylindrical base. Preferably, the base rests on a substantially flat surface. A compact disk shaped adhesive label is placed onto a surface area of the positioning plate with the adhesive side of the label facing away from the positioning plate. The label is positioned so that its center hole area is directly over the positioning hole in the positioning plate. Thereafter, the compact disk is placed onto the positioning cone with the readable side of the compact disk facing away from the cone by placing the elongated stock through a center hole in the compact disk so that a center area of the compact disk is resting upon a flat surface of the cone when the stock is held. The compact disk is then lowered onto the label by inserting the positioning cone through the center hole area of the self-adhesive label and the positioning hole in the positioning plate and into the hollow core portion of the cylindrical base. The compact disk is then manually pressed to affix the label to the disk. The compact disk with the newly affixed label is lifted by lifting the elongated stock and pulling the positioning cone out of the positioning hole and the hollow core portion. Thereafter, the compact disk is lifted off the elongated stock. The positioning plate is removed from the cylindrical base and used to further press the label onto the compact disk. This last step is carried out by placing the positioning plate on top of the compact disk and manually pressing the plate against the disk while the disk is lying on a substantially flat surface.

Other details of the labeler and the method of the present invention are set out in the following description.

BRIEF DESCRIPTION OF THE DRAWINGS

The FIGURE illustrates a labeler in accordance with the present invention for the near perfect placement of pre-made adhesive labels onto compact disks.

DETAILED DESCRIPTION OF THE PREFERRED EMBODIMENT

Referring now to the FIGURE, a compact disk labeler is illustrated which provides for the placement of self adhesive labels 400 onto compact disks 200. The labeler includes a base unit 600, a positioning plate 500 and a positioning cone 300.

As shown in the FIGURE, compact disk 200 has a center hole 210, a center area 220 where there is no recordable medium, a medium surface 230 which contains the recordable medium, and an outer edge 240 which does not have any recordable medium. At present, compact disks 200 have a diameter of 12 centimeters, but this invention envisions other sizes. At present, center hole 210 has a diameter of 1.5 centimeters, but this invention envisions other diameters as well. At present, center area 220 has a diameter of 4 centimeters, but this invention envisions other diameters. At present, the outer edge 240 is 1 millimeter wide, but this invention envisions other widths. Compact disk 200 also has a side which can be covered with a label and a side which cannot be covered so as to allow the information stored upon the compact disk to be accessed. The difference between the different sides of a compact disk 200 as well as the general design of compact disks 200 are well known to those skilled in the art.

As mentioned before, the labeler includes a positioning cone 300. Positioning cone 300 can be manufactured of metal, wood, hard plastic, or any other durable material. Protruding from positioning cone 300 is elongated stock 310. Elongated stock 310 is specifically designed to fit inside the center hole 210 of compact disk 200. The fit is preferably relatively snug, so as to provide easy penetration as well as separation from the center hole 210 of compact disk 200 and to provide that compact disk 200 will have little side-to-side movement while it is seated on elongated stock 310. Preferably, the diameter of the elongated stock 310 will be 0.5 millimeters less than the diameter of center hole 210, although other diameters may also be suitable. Elongated stock 310 is also preferably long enough so as to provide easy gripping by the user when a compact disk is on said elongated stock. Preferably, the elongated stock 310 will be from 1 to 2 inches long from the tip 311 to where it attaches to flat surface 320, although other lengths are envisioned and may be used.

Flat surface 320 is designed to stop the compact disk 200 from moving any further down elongated stock 310 when positioning cone 300 is held so that elongated stock 310 is pointing upwardly or towards the sky. Flat surface 320 is integrally linked to elongated stock 310 and body member 330. Body member 330 comes to a point 340 and is designed to give strength and structure to flat surface 320. Point 340 is designed to facilitate the easy penetration and exit of positioning cone 300 into and through positioning hole 520 in positioning plate 500. Overall, the configuration of positioning cone 300 is much like a classic spinning top, although the present use as described by the claims of this invention was never envisioned in such a spinning top configuration. The diameter of flat surface 320 is designed to be very close to or even exactly equal to the diameter of the center area 220 of compact disk 200 and greater than that of the elongated stock. Therefore, when compact disk 200 is placed upon elongated stock 310 by placing tip 311 into center hole 210, the compact disk 200 will rest against the flat surface 320 so that if the compact disk 200 and positioning cone 300 were observed by looking at the point 340 with elongated stock 310 positioned away from the observer, that all of the compact disk 200 would be visible except for center hole 210 and center area 220.

A self-adhesive label 400 is shown in the FIGURE which is designed to fit onto the top of a compact disk 200 so as to allow for easy identification of the information provided upon compact disk 200. Self-adhesive label 400 has a writing surface 410 upon which text can be printed using a laser printer, pen, typewriter or other writing means. Self-adhesive labels are produced to fit onto compact disk 200, covering all or most of the non-readable side of the compact disk 200 except for the center hole 210, the center area 220, and the outer edge 240. On the opposite side of self-adhesive label 400 from writing surface 410 is adhesive side 420. Adhesive side 420 is typically covered with a glue so as to permanently attach the self-adhesive label 400 to whatever the user wishes to attach the self-adhesive label 400 to. Self-adhesive label 400 typically has a hole area 430 where there is no label material, and which leaves self-adhesive label 400 having a flat doughnut or flat bagel-like configuration. Hole area 430 will typically correspond to and have a similar, if not exact, diameter to that of center area 220 of compact disk 200. Such self-adhesive labels 400 are typically manufactured from paper, vinyl or any other material suitable for writing on labels. Such self-adhesive labels 400 are well known to those skilled in the art.

Referring to the FIGURE, a positioning plate 500 is illustrated. Positioning plate 500 has a positioning hole 520, a top area 510, and a side area 530. Positioning hole 520 is located substantially in the center of the plate 500 and is designed to allow positioning cone 300 to slide through it. Ideally, positioning hole 520 will have a diameter about 0.5 millimeters larger than positioning hole 300, although other diameters are also envisioned. Additionally, the diameter of the positioning hole is substantially the same as the diameter of the center area of the compact disk. The diameter of positioning hole 520 is designed so as to allow positioning cone 300 to easily penetrate and exit position hole 520, while avoiding side to side movement.

Surface area 510 is designed so that a compact disk 200 can rest upon it without going or extending over its edges. Preferably, surface area 510 will have a diameter about 1 centimeter larger than the diameter of compact disk 200, although other diameters are also envisioned. The larger diameter is provided to facilitate a flat surface so that self-adhesive labels 400 can be placed upon compact disks 200 with minimum bubbling.

The side area 530 provides thickness and strength for positioning plate 500. As such, side area 530 must be wide enough to limit the flexibility of the positioning plate 500. Positioning plate 500 may be manufactured from metal, wood or any other suitable sturdy and durable material. Positioning plate 500 may be covered with a soft material such as, but not limited to, flannel so as to avoid scratching the compact disk 200.

A cylindrical base 600 is also illustrated in the FIGURE. Cylindrical base 600 has a flat lip member 610, a flat bottom 630, a wall 620 and a hollow cavern 640. Flat lip member 610 is designed to allow positioning plate 500 to rest flatly on top of it. Therefore, flat lip member 610 preferably has a diameter which is smaller than that of positioning plate 500 so that positioning plate 500 is stably supported by cylindrical base 600.

Wall 620 must raise flat lip member 610 off of the table top, or any other surface the user desires, at a height which will allow positioning cone 300 to pass through positioning hole 520 of positioning plate 500 so that if positioning cone 300 were to enter with point 340 first, all of the positioning cone 300 except for elongated stock 310, could fit below the level of flat lip member 610.

Flat bottom 630 must be flat so that cylindrical base 600 will sit stably on the table top or whatever surface the user plans to use.

Hollow core 640 must merely be large enough to allow positioning cone 300 to fit within the hollow core 640, if positioning cone 300 were to enter with point 340 first, and all of the positioning cone 300, except for elongated stock 310, were to fit below the level of flat lip member 610.

It has been found that an empty filter housing (the structure in which a person places both a coffee filter and coffee grounds) is particularly suited for use as cylindrical base 600.

In use, a user places positioning plate 500 on top of cylindrical base 600 so that positioning plate comes into contact with flat lip member 610. Meanwhile, flat bottom 630 rests upon a table top or any other desired flat surface. Then, the user places self-adhesive label 400 onto surface area 510 of positioning plate 500, with adhesive side 420 facing up and away from positioning plate 500. Self-adhesive label 400 is placed on positioning plate 500 in a manner which positions self-adhesive label 400 so that hole area 430 is directly over positioning hole 520. As such, an observer should be able to see through self-adhesive label 400 and positioning plate 500 and into cylindrical base 600.

Then compact disk 200 is placed onto positioning cone 300 by placing elongated stock 310 through center hole 210, so that center area 220 of compact disk 200 is resting upon flat surface 320, when elongated stock 310 is held so that tip 311 is pointing towards the sky. Then the user, who is holding elongated stock 310 lowers compact disk 200 onto the self-adhesive label 400 by inserting positioning cone 300, with the point 340 entering first, through hole area 430 and positioning hole 520, and into hollow core 640 of cylindrical base 600. As compact disk 200 comes to rest upon self-adhesive label 400, which is supported by positioning plate 500, compact disk 200, will separate from flat surface 320, while still remaining on elongated stock 310. In this manner, self-adhesive label 400 is secured onto compact disk 200 so that the label will cover substantially all of the non-readable side of the compact disk 200 except for the center hole 210, the center area 220 and the outer edge 240. Pressing with the user's fingers further facilitates proper adhesion. The user then lifts compact disk 200 with its newly affixed self-adhesive label 400 by lifting elongated stock 310 and pulling positioning cone 300 out of both positioning hole 520 and hollow core 640. The user then removes compact disk 200 from positioning cone 300 by lifting compact disk 200 off of elongated stock 310. The user then removes positioning plate 500 from cylindrical base 600, and while laying compact disk 200 on a flat surface, which may be covered with a soft material such as a cotton towel, proceeds to press the self-adhesive label 400 further onto compact disk 200, by placing positioning plate 500 on top of compact disk 200 and then pressing. The result produces a compact disk with a label affixed near-perfectly and with limited bubbles.

What is claimed is:

1. A labeler for the placement of an adhesive label onto a compact disk having a central aperture corresponding to a spindle hole, said adhesive label having a central aperture corresponding to a central area of the compact disk, said central aperture of the compact disk being smaller than said central area of the disk, said labeler comprising:
   a positioning system having a first guide portion having a cross section corresponding to the central aperture of the compact disk and a second guide portion corresponding to a cross section of the central aperture of the adhesive label, said first guide portion and said second guide portion each abutting a shoulder region,
   said first guide portion being for aligning the compact disk,
   said second guide portion being for aligning the adhesive label,
   said shoulder region being capable of applying a force to the compact disk to limit a displacement thereof toward the second guide portion.

2. The labeler according to claim 1, wherein:
   said positioning system has an axis, said first guide portion and said second guide portion being coaxial with said axis and said shoulder region having a plane normal to said axis,
   said first guide portion being for coaxially aligning the compact disk with said axis,
   said second guide portion being for coaxially aligning the adhesive label with said axis,
   said shoulder region limiting a displacement along said axis.

3. The labeler according to claim 1, wherein said positioning system further comprises a tapered portion at an end of said second guide portion opposite said shoulder region.

4. The labeler according to claim 1, further comprising a member having a surface and an aperture in said surface, said aperture corresponding to a cross section of said second guide portion.

5. The labeler according to claim 4, further comprising a base supporting said member.

6. The labeler according to claim 5, wherein said base surrounds a hollow space for receiving at least a portion of said second guide portion.

7. The labeler according to claim 4, said surface being for applying a force against said shoulder region to adhere the compact disk and the label.

8. The labeler according to claim 4, wherein said member comprises a disk having a diameter which is slightly larger than the outer diameter of a compact disk.

9. The labeler according to claim 4, wherein said aperture is substantially in the center of said surface.

10. The labeler according to claim 4, wherein said aperture of said surface is a circular hole having substantially the same diameter as the central area of the compact disk.

11. The labeler according to claim 1, wherein said first and second guide portions are formed of a single substrate.

12. The labeler according to claim 1, wherein said first guide portion is additionally adapted for use as a handle.

13. The labeler according to claim 1, wherein said positioning system is fabricated from plastic.

14. An apparatus for applying a label having an aperture to a disk, comprising (a) a positioning member having an end, (b) a stock corresponding in shape to the aperture of the label and (c) a disk locating element, said stock being between said end said disk locating element, said stock centering said positioning member with respect to a self-adhesive label, said disk locating element aligning a compact disk with said stock,
   the label being positioned in relation to said disk locating member by insertion of said end and then said stock through the label aperture, so that the label is aligned prior to contact with a compact disk and a force therebetween causes adhesion.

15. The apparatus according to claim 14, wherein said end comprises a guide, adapted to gradually position the label with respect to said positioning member upon insertion of said guide through said label aperture.

16. The apparatus according to claim 14, wherein said guide comprises a conical taper.

17. The apparatus according to claim 14, wherein said disk locating member is circular, corresponding in size to the center hole of the compact disk.

18. The apparatus according to claim 14, wherein said disk locating element comprises a cylindrical element adapted for passing through a spindle hole of a compact disk to align the compact disk with said stock.

19. The apparatus according to claim 14, wherein said stock is cylindrical, having a diameter approximately equal to a central area of a compact disk.

20. The apparatus according to claim 14, further comprising a member having a surface and an aperture through said surface, said aperture being adapted for receiving said stock of said positioning member, said end positioning said positioning member with respect to said surface,
   the label being positioned in relation to said disk locating member by insertion of said stock into the label aperture and said aperture in said surface, said disk locating member and said surface being arranged so that a mutual compression of the disk and said positioning plate with the label therebetween urges the label to be immediately adjacent the disk.

21. The apparatus according to claim 20, wherein said stock has a cross section corresponding to said aperture.

22. The apparatus according to claim 21, wherein said stock is cylindrical, form fitting into said aperture.

23. The apparatus according to claim 21, wherein said end comprises a taper, said taper facilitating insertion of said stock through the aperture of the label and said aperture of said surface.

24. The apparatus according to claim 14, wherein said positioning member comprises an elongated body, an axis, a first tapered end of said body, a second perpendicular surface of said body opposite said tapered end and normal to said axis, and a coaxial guide disposed on said surface, said coaxial guide defining a cross section having an area smaller than said surface and coaxial with said axis, said coaxial guide being for coaxially aligning a spindle hole of a compact disk, said elongated body of said positioning member being adapted to pass through the aperture of the adhesive label and to coaxially align the adhesive label with the coaxial guide, said labeler being adapted such that a compact disk is axially aligned with said coaxial guide, the adhesive label centered over said tapered end and passes around said elongated body, the compact disk held stationary along said axis with respect to said positioning member by said perpendicular surface, and the adhesive label compressed against the compact disk to adhere thereto.

25. The apparatus according to claim 14, wherein said positioning member comprises an elongated body, an axis, a first tapered end of said body, a second perpendicular surface of said body opposite said tapered end and normal to said axis, and a coaxial guide disposed on said surface, said coaxial guide defining a cross section having an area smaller than said surface and coaxial with said axis, further comprising a positioning plate having a positioning guide;

said coaxial guide being for coaxially aligning a spindle hole of a compact disk;

said positioning guide being for aligning said positioning member and said positioning plate;

said elongated body of said positioning member being adapted to pass through the aperture of the adhesive label and to coaxially align the adhesive label with the coaxial guide;

said positioning plate being adapted to resist a force parallel to said axis, said labeler being adapted such that a compact disk is axially aligned with said coaxial guide, the adhesive label centered over said tapered end and passes around said elongated body, the compact disk held stationary along said axis with respect to said positioning member by said perpendicular surface and said positioning plate, and compressed against the compact disk to adhere thereto.

26. The apparatus according to claim 25, wherein said coaxial guide has a circular cross section which corresponds in size to a cross section of a center hole of a compact disk.

27. The apparatus according to claim 25, wherein said elongated body has a diameter which substantially corresponds with that of a center area of a compact disk.

28. The apparatus according to claim 25, wherein said coaxial guide comprises a cylindrical extension.

29. The apparatus according to claim 25, wherein said positioning guide comprises a recess form fitting said positioning member.

30. The apparatus according to claim 25, wherein a compact disk is held coaxially aligned with said positioning member by a cylindrical member.

31. The apparatus according to claim 14, wherein said positioning member comprises a cylindrical body, an axis, a surface of said body perpendicular to said axis, and a coaxial guide defining a cross section having an area smaller than said cylindrical body coaxial with said axis, said coaxial guide being for coaxially aligning a spindle hole of a compact disk, said cylindrical body being adapted to pass through the aperture of an adhesive label, said surface being adapted to resist a force applied thereto, said labeler being adapted such that a compact disk is axially aligned with said coaxial guide, the adhesive label centered by said cylindrical body, the compact disk held stationary along said axis with respect to said positioning member by said perpendicular surface, and the label being pressed against the compact disk to adhere thereto.

32. The apparatus according to claim 31, wherein said coaxial guide comprises a cylindrical extension adapted to fit through a spindle hole of a compact disk.

33. The apparatus according to claim 31, further comprising a plate having a surface and a recess for receiving said cylindrical body of said positioning member, said surface being adapted to resist a force applied thereto, said labeler being adapted such that a compact disk is axially aligned with said coaxial guide, the adhesive label centered by said cylindrical body and supported by said surface, the compact disk held stationary along said axis with respect to said positioning member by said perpendicular surface, and compressed between the compact disk and the plate to adhere to the compact disk.

34. The apparatus according to claim 33, wherein said recess conforms to said positioning member.

35. A labeler for the placement of self-adhesive labels onto compact disks comprising:

a positioning cone having a tapered end, a surface opposite said tapered end and an extension extending from said surface and away from said tapered end, said extension having a cross sectional area smaller than an area defined by an outer perimeter of said surface;

a positioning plate having a surface and a positioning hole; and a base supporting said positioning plate, having a hollow space for receiving said tapered end of said positioning cone.

36. An apparatus for applying a label having an aperture to a disk, comprising:

(a) a positioning member having (i) a guide, (ii) a stock corresponding in shape to the aperture of the label and (iii) a disk locating member, said stock being between said guide and said disk locating member;

(b) a positioning plate having an aperture and a surface, said positioning plate aperture being adapted for receiving said stock of said positioning member, said guide centering said positioning member in said positioning plate aperture upon insertion of said guide in said positioning plate aperture, the label being positioned in relation to said disk locating member by insertion of said guide and said stock into the label aperture and said positioning plate aperture, said disk locating member and said surface being arranged so that a mutual compression of the disk and said positioning plate with the label therebetween urges the label to be immediately adjacent the disk.

* * * * *